United States Patent [19]

Sandau

[11] 4,142,546

[45] Mar. 6, 1979

[54] VALVE ARRANGEMENT FOR A PRESSURIZABLE VESSEL

[75] Inventor: Harmut Sandau, Moglingen, Fed. Rep. of Germany

[73] Assignee: Robert Bosch GmbH, Stuttgart, Fed. Rep. of Germany

[21] Appl. No.: 741,459

[22] Filed: Nov. 12, 1976

[30] Foreign Application Priority Data

Nov. 14, 1975 [DE] Fed. Rep. of Germany ....... 2551124

[51] Int. Cl.² ........................ F161 55/10

[52] U.S. Cl. ........................ 137/321

[58] Field of Search ............... 137/317, 318, 319, 320, 137/321, 322, 323; 251/282, 283

[56] References Cited

U.S. PATENT DOCUMENTS

| | | | |
|---|---|---|---|
| 659,288 | 10/1900 | Church | 137/321 |
| 865,713 | 9/1907 | Lamouroux | 137/321 |
| 1,720,705 | 7/1929 | Waterman | 251/282 |
| 1,938,984 | 12/1933 | Smith | 137/319 |
| 2,638,914 | 5/1953 | Flaith et al. | 137/321 |
| 2,790,571 | 4/1957 | Flaith et al. | 137/321 |
| 2,800,912 | 7/1957 | McCamish et al. | 137/321 |
| 2,865,530 | 12/1958 | Gould | 137/321 |
| 3,552,421 | 1/1971 | Yocum | 137/321 |
| 3,765,642 | 10/1973 | Nelson | 251/282 |
| 3,995,655 | 12/1976 | Sands | 137/318 |
| 4,071,012 | 1/1978 | Cooke | 137/321 |

FOREIGN PATENT DOCUMENTS

| | | | |
|---|---|---|---|
| 8109 of | 1893 | United Kingdom | 137/321 |
| 22208 of | 1893 | United Kingdom | 137/321 |

*Primary Examiner*—Martin P. Schwadron
*Assistant Examiner*—G. L. Wolton
*Attorney, Agent, or Firm*—Michael J. Striker

[57] ABSTRACT

A valve arrangement for a pressurizable vessel includes a valve member mountable on a vessel for movement relative thereto. The valve member is formed with a passage which extends over part of the length of the valve member. A valve-actuating assembly is removably mountable on the vessel. The assembly includes a fitting surrounding the valve member with clearance at the exterior of the vessel, a housing movably mounted within the fitting, and force-transmitting elements partially received within the housing and operative for displacing the valve member between an open position in which the passage communicates the vessel interior with the clearance so as to permit fluid flow between the interior and exterior of the vessel, and a closed position in which such fluid flow is prevented.

13 Claims, 4 Drawing Figures

VALVE ARRANGEMENT FOR A PRESSURIZABLE VESSEL

BACKGROUND OF THE INVENTION

The present invention relates to a valve arrangement for a pressurizable vessel and, more particularly, to such an arrangement in which a valve-actuating assembly is removably mountable with respect to the vessel.

Pressurizable vessels are known in which a structure for communicating the interior of the vessel with the exterior thereof is located at the filler opening of the vessel. Such structures are generally used for either filling and/or emptying the pressurizable vessels.

When it is desired to store such vessels in a storage area of given size, these prior-art vessels have the disadvantage that a relatively large portion of the storage area is unavoidably occupied by the filling and/or emptying structures provided for each vessel. Since these structures are fixedly mounted on the vessels, it will be appreciated that, when many such vessels are to be stored, the available storage space is greatly reduced.

SUMMARY OF THE INVENTION

Accordingly, it is an object of the present invention to overcome the drawbacks of the prior art.

An additional object of the present invention is to maximize the capacity of a storage area to hold pressurizable vessels.

Still another object of the present invention is to provide a valve arrangement for a pressurizable vessel in which a valve-actuating assembly is removably mountable from the vessel.

In keeping with these objects and others which will become apparent hereinafter, one feature of the invention resides, briefly stated, in a valve arrangement for a pressurizable vessel which comprises a valve member mountable on a vessel for movement relative thereto. Passage means are provided on the valve member so as to move together with the latter, the passage means extending in part along the length of the valve member. The valve arrangement also comprises a valve-actuating assembly which is removably mountable on the vessel. The assembly includes a fitting which surrounds the valve member with clearance at the exterior of the vessel, and means for displacing the valve member between an open position in which the passage means communicates the vessel interior with the clearance so as to permit fluid flow between the interior and exterior of the vessel, and a closed position in which such fluid flow is prevented.

The feature of removably mounting the valve-actuating assembly with respect to the vessel maximizes the storage space which is required to store the vessels. Thus, the pressurizable vessel can be opened or closed as desired by mounting the above-described valve arrangement on the vessel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
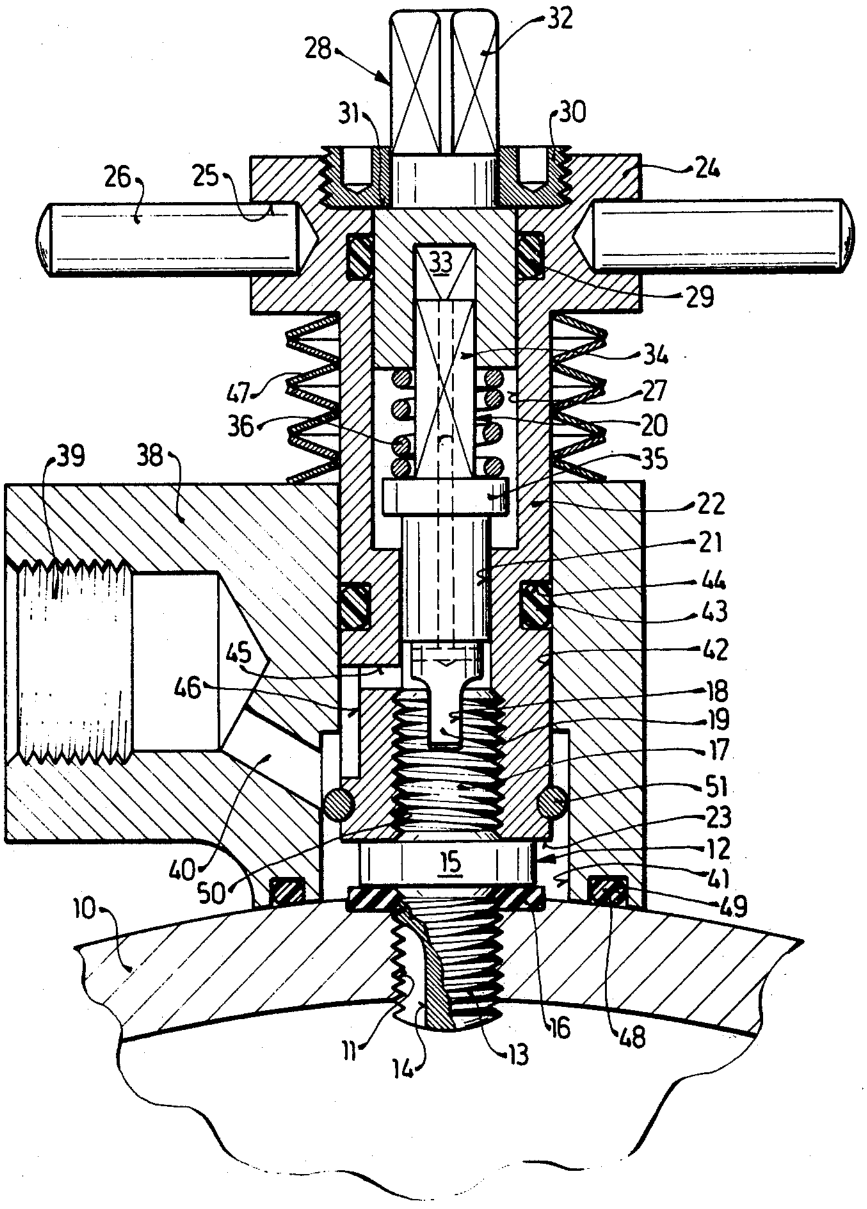
FIG. 1 is a partial sectional view of a preferred embodiment of the arrangement according to the present invention.

FIG. 1 shows a valve arrangement for filling and/or emptying a vessel with a fluid medium, preferably a pressurized fluid. The vessel is only partially depicted and has wall portions 10 defining a threaded filler opening 11 which extends through the thickness of the vessel in direction from the interior to the exterior thereof. A valve member 12 has a threaded shaft portion 13 threadedly mounted in opening 11. Passage means or longitudinal slit 14 is formed in shaft portion 13 and extends lengthwise over part of the length thereof. In the embodiment of FIG. 1, the passage 14 terminates short of the shoulder 15 so that, in the illustrated closed position of the valve member 12, the interior of the vessel does not communicate with the exterior thereof. Sealing means or ring 16 is provided intermediate the shoulder or flange portion 15 and the outer wall 10 of the vessel. The valve member 12 also has another threaded part 17 on the other side of shoulder 15 which is provided with a transverse slit or recess 18. As illustrated, threaded portion 17 has a pitch which runs in opposite direction to the pitch of threaded portion 13.

A valve-actuating assembly is removably mountable on the vessel. The assembly comprises fitting 38 which surrounds the valve member 12 with clearance 41, and displacing means 20, 28 which are operative for moving the valve member 12 between the illustrated closed position and an open position in which passage 14 communicates the vessel interior with clearance 41 so as to permit fluid flow either into or out of the vessel.

The assembly also has a hollow cylindrical housing 22 surrounded in part by the fitting 38. The housing 22 has an interior threaded portion 50 which threadedly engages the threaded portion 17 of the valve member 12 until the rear end face 23 engages the shoulder 15. At the opposite end of the housing 22, flange part 24 is provided with transverse bores 25 each of which tightly receives a pin 26. The pins 26 are operative to turn the housing 22 relative to the fitting 38.

The housing 22 has an interior passageway comprised of coaxially arranged longitudinal bore sections 27 and 21. The displacing means 20, 28 includes a first element 28 having a turnable actuating part 32 extending outwardly of the housing 22, and another part mounted in bore section 27 for turning movement therewith. Sealing means 29 is provided in a groove in housing 22 so as to provide sealing contact between housing 22 and the other part of first element 28. First element 28 is prevented from axially shifting relative to longitudinal bore section 27 by nut 30 which is threaded into housing 22 until it abuts against an end face 31 of the housing 22.

The outer turnable actuating part 32 is adapted to be turned by a turning tool. For example, the part 32 may be provided with a polygonally-shaped configuration, such as the illustrated four-sided configuration.

The displacing means also comprises a second element 20 mounted for turning movement in longitudinal bore section 21. The second element 20 generally comprises a pin 34, a projection 19, and a shoulder 35 intermediate the pin and projection. The pin 34 is adapted to be received in a socket 33 formed in the first element 28 so that any turning of the latter will cause the second element 20 to also participate in such turning. Thus, the pin 34 and socket 33 may have a polygonally-shaped configuration, for example the illustrated four-sided configuration, in order to obtain reliable force transmission between the elements.

A helical spring 36 is provided intermediate elements 28 and 30, particularly between an axial end face of element 28 and the shoulder 35 of element 20, for positively urging the projection 19 towards the recess 18 of valve member 12.

The fitting 38 has a longitudinal bore 42 in which a portion of the cylindrical housing 22 is received for turning movement. During such movement, sealing contact is maintained by sealing ring 43 located in circular groove 44 which is formed about housing 22. The fitting 38 has an inlet bore 39 which has a threaded section for connection to a non-illustrated fluid reservoir. The reservoir may contain fluid for filling the vessel, or it may be required to be filled by the fluid in the vessel. In communication with inlet bore 39, a connecting bore 40 extends at an angle thereto, preferably 45°, towards the clearance 41 at the exterior of the vessel. Thus, an open-flow path is provided between the inlet 39 and the clearance 41.

Also in communication with inlet 39, the housing 22 is formed with a longitudinal vent bore 46 and a transverse vent bore 45. The vent bores 45, 46 are in communication with each other and establish communication between the inlet 39 and the longitudinal bore section 21 of the interior passageway of housing 22. In addition, the second element 20 also comprises longitudinally- and transversely-extending vent passages shown in dashed lines in the interior of the housing 22. These vent passages cooperate with vent bores 45 and 46 to achieve a pressure equilibrium between the upper and lower parts of the second element 20.

Dish-shaped or Belleville-type springs 47 are arranged between the upper side of fitting 38 and the lower side of flange 24 of the housing 22 for strongly urging the fitting 38 into sealing contact with the upper wall portions 10 of the vessel. The lower side of fitting 38 is provided with groove 49, and sealing means 48 are placed in the groove for better sealing.

Above the sealing means 48, a snap ring 51 is provided in an annular groove formed about the lower end of housing 22. Thus, the fitting 38 can now not be downwardly pushed away from the housing 22 when the latter is screwed off the threaded portion 17 and removed from the valve member 12.

Figure 4:
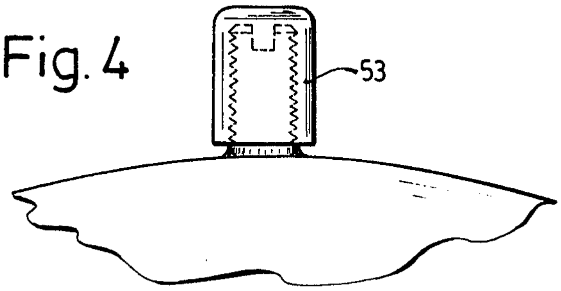
FIG. 4 is a side view of a capped vessel after the valve-actuating assembly has been removed therefrom.

Normally, the pressurizable vessel is stored without the valve-actuating assembly mounted thereon. As shown in FIG. 4, the valve member 12 is in its closed position and may be closed by a closure cap 53. If it is then desired to fill the interior of the vessel with a fluid, such as pressurized gas, the cap 53 is threaded off the valve member 12, and thereupon the threaded portion 50 of housing 22 is threaded onto threaded portion 17 of valve member 12. The fitting 38 is preferably already mounted about housing 22.

The pins 26 are now turned until the housing 22 compresses the dish springs 47 and causes the latter to urge the fitting 38 tightly against wall portions 10. Next, the actuating part 32 of first element 28 is turned until the projection 19 is properly aligned with the transverse recess 18 and is thereupon urged therein by the force of the spring 36. Once the projection is properly seated in recess 18, further turning of the first element 28 in requisite direction (for example counterclockwise) causes the second element to also turn which then causes the valve member 12 to unthread at a rate of about two revolutions relative to the vessel 10 for each revolution of the first element due to the different pitches of thread portions 17 and 13.

A gas bottle reservoir may now be connected to inlet 39 in which, after opening of the gas tap of the bottle, the pressurized gas enters through bore 40, into the clearance 41, and through the passage means 14 so as to finally enter the interior of the vessel 10. Once the desired pressure has been reached, turning of the actuating part 32 in opposite direction (for example clockwise) causes the valve member 12 to thread back into the vessel thereby closing the same.

Likewise, turning the pins 26 in opposite direction will cause the housing 22 to unthread from the threaded portion 17. The cap 53 may now be threaded onto the threaded portion 17. Thereby, a minimum amount of storage space is required for the vessel.

Figure 2:
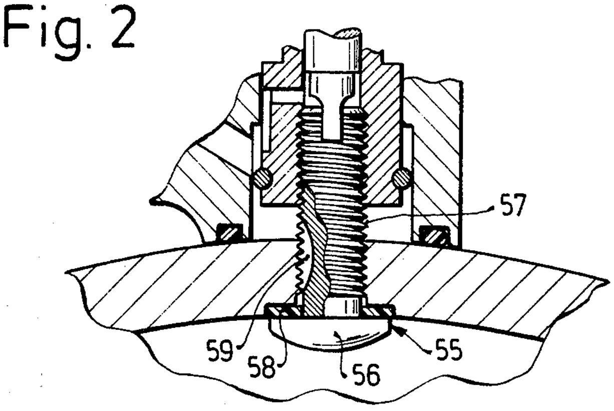
FIG. 2 is a partial sectional view analogous to FIG. 1 showing a modification of the preferred embodiment.

FIG. 2 is essentially analogous to FIG. 1 and is differentiated therewith with respect to the configuration of the valve member and the arrangement for sealing the vessel. The valve member 55 has a threaded portion 57 which threadedly engages the housing 22, and a head or flange part 56 located in the interior of the vessel. Intermediate the flange 56 and the inner wall of the vessel, a sealing ring 58 is situated. When the vessel is filled with a pressurized fluid medium, the flange 56 is pressed tightly against the ring 58. In contrast to FIG. 1 wherein the passage means 14 is always in communication with the interior of the vessel, the passage means 59 of FIG. 2 is always in communication with the clearance at the exterior of the vessel.

Figure 3:
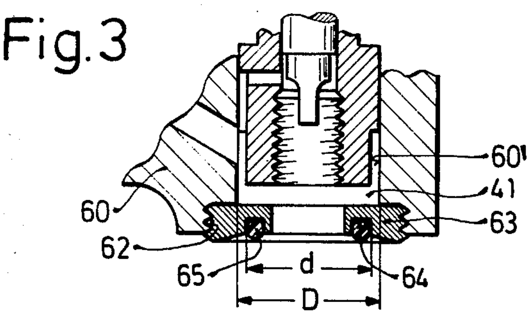
FIG. 3 is a partial sectional view showing a modification of a detail of FIG. 1.

With respect to the embodiment of FIG. 3, the details of the vessel have been removed from the drawing for the sake of clarity. Otherwise, FIG. 3 depicts a modified version of the sealing means provided at the filler opening adjacent the fitting 60. The fitting 60 has a longitudinal bore 60' which is in communication with the clearance 41. A tapped bore 62 is located beneath this clearance 41, and a threaded annular member 63 is mounted in bore 62. At the underside of ring member 63, an annular groove 64 is formed for receiving a sealing ring 65. The outer diameter d of sealing ring 65 is less than that of the inner diameter D of bore 60'. The function of sealing ring 65 is essentially the same as the sealing means 16 of FIG. 1, except that here the annular member 63 is pressed against the outer wall of the vessel.

It will be understood that each of the elements described above, or two or more together, may also find a useful application in other types of constructions differing from the types described above.

While the invention has been illustrated and described as embodied in a valve arrangement for pressurizable vessels, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A valve arrangement for a pressurizable vessel, comprising a valve member mountable on a vessel for movement relative thereto, said valve member having passage means which extends in part along said valve member and which is movable together with the latter, said valve member having an exterior portion; and a valve-actuating assembly removably mountable on the vessel, including a fitting having a passage and surrounding said valve member with clearance at the exterior of the vessel, further including a housing in said passage of said fitting and provided with an interior passageway in which said exterior portion of said valve member is movably received, and means provided within said interior passageway of said housing for displacing said valve member between an open position in which said passage means communicates the vessel interior with the clearance so as to permit fluid flow between the interior and exterior of the vessel, and a closed position in which said fluid flow is prevented.

2. An arrangement as defined in claim 1, wherein said valve member has a threaded shaft portion mounted for turning movement relative to the vessel, said passage means extending in part along said shaft portion and being movable in direction between the interior and exterior of the vessel upon turning of said shaft portion.

3. An arrangement as defined in claim 1, wherein said housing is removably mountable on said valve member, said fitting surrounding a portion of said housing in sealing relationship; and further comprising means intermediate said housing and said fitting for urging the latter towards the vessel so as to sealingly contact the same.

4. An arrangement as defined in claim 1, wherein said valve member comprises a threaded shaft portion threadedly mounted on the vessel, and a flange portion in juxtaposed relationship with the vessel; and further comprising means intermediate said flange portion and the vessel for sealing the latter.

5. An arrangement as defined in claim 4, wherein said sealing means and said flange portion are located in the interior of the vessel.

6. A valve arrangement as defined in claim 1, wherein said interior passage of said housing has a threaded portion for threadingly engaging said exterior threaded portion.

7. A valve arrangement as defined in claim 1, wherein said displacing means is mounted in said passageway, and includes a first element having a movable actuating part extending outwardly of said housing, and a second element in force-transmitting relationship with said first element and having a projection; and means including a recess formed in said valve member and operative for receiving said projection and for moving said valve member relative to the vessel in response to movement of said actuating means.

8. An arrangement as defined in claim 7, wherein one of said elements has a polygonally-shaped pin, and the other of said elements has a polygonally-shaped socket for receiving said pin in force-transmitting relationship.

9. An arrangement as defined in claim 7; and further comprising means intermediate said elements for urging said projection towards said recess so that the former positively engages the latter.

10. A valve arrangement as defined in claim 1, wherein said fitting has a longitudinal bore and said housing is cylindrical and has a portion which is received in said longitudinal bore in sealing relationship, said fitting comprisng an inlet bore adapted to be connected to a fluid reservoir, and a connecting bore for establishing communication between said inlet bore and said clearance, said housing comprising a longitudinal vent bore in communication with said clearance, and a transverse vent bore in communication with said longitudinal vent bore and with said interior passageway, said vent bores being operative for establishing communication between said inlet bore and said interior passageway.

11. A valve arrangement as defined in claim 1, wherein said valve member comprises a threaded shaft portion threadedly mounted on the vessel, and a flange portion in juxtaposed relationship with the vessel; and further comprising an annular member having an annular groove and being mountable on a side of said fitting which faces the vessel; and means intermediate said flange portion and the vessel for sealing the latter located in said annular groove of said annular member.

12. A valve arrangement for a pressurizable vessel, comprising a valve member mountable on a vessel for movement relative thereto, said valve member having passage means which extends in part along said valve member and which is movable together with the latter; a valve-actuating assembly removably mountable on the vessel, including a fitting having a passage and surrounding said valve member with clearance at the exterior of the vessel, means for displacing said valve member between an open position in which said passage means communicates the vessel interior with the clearance so as to permit fluid flow between the interior and exterior of the vessel, and a closed position in which such fluid flow is prevented, and further including a housing in said passage of said fitting and having an interior passageway therein, said housing being removably mountable on said valve member so that the latter is partially received into said interior passage-way and having a portion surrounded by said fitting in sealing relationship, said housing having a flange portion in overlying relationship with said fitting; and spring means intermediate said housing and said fitting for urging the latter towards the vessel so as to sealingly contact the same, said urging means having opposite ends in respective abutment with said flange portion and said fitting.

13. A valve arrangement for a pressurized vessel, comprising a valve member having an interior threaded portion mounted in a wall of the vessel for turning and axial movement relative to the latter, said interior threaded portion of said valve member being provided with a groove which cuts through and extends along an outer surface of said interior threaded portion, said groove being open into the interior of the vessel, said valve member having an exterior threaded portion; and a valve actuating assembly removably mountable on the vessel and including a fitting surrounding said valve member with clearance at the exterior of the vessel provided within said housing for engaging said exterior threaded portion of said valve member and operative for displacing the latter between an open position in which said interior threaded portion is so located that said groove of said interior threaded portion also communicates with said clearance so as to permit fluid flow between the exterior and interior of the vessel, and a closed position in which said interior threaded portion is so located that the wall of the vessel prevents said communication of said groove of said interior threaded portion with said clearance whereby said fluid flow between the exterior and interior of the vessel is prevented.

* * * * *